Dec. 1, 1970
E. LOMAS
3,543,557
EXTRUSION PRESS WITH DIE-CHANGING DEVICE
Filed Oct. 28, 1968
5 Sheets-Sheet 1

United States Patent Office 3,543,557
Patented Dec. 1, 1970

3,543,557
EXTRUSION PRESS WITH DIE-
CHANGING DEVICE
Ernest Lomas, Wimbourne, Dorset, England, assignor to Loewy Robertson Engineering Company Limited, Dorset, England
Filed Oct. 28, 1968, Ser. No. 771,058
Claims priority, application Great Britain, Nov. 1, 1967, 49,693/67
Int. Cl. B21c 23/00
U.S. Cl. 72—263
12 Claims

ABSTRACT OF THE DISCLOSURE

An extrusion press has its die or die assembly supported on a die slide which is movable transversely of the extrusion axis of the press by hydraulic propulsion means to a position in which the axis of the die is not coincident with the extrusion axis and adjacent a die change mechanism and further hydraulic means serve to displace the die or die assembly from the slide in this position to the die change mechanism. Further means are provided for displacing a replacement die or die assembly which has been held in a heated oven into the die slide.

---

This invention relates to an extrusion press with a die-change device arranged externally of the press.

The invention relates in particular to that type of horizontal extrusion press having a hydraulically propelled die-slide which can be traversed across the extrusion axis so that a die mounted in the slide can be moved between a position in the extrusion axis of the press and an outside station in which the die can be transferred to a die-change device arranged externally of the press and adjacent the die-slide. The die-change device and the die-slide co-operate with each other in such a manner that after a used die has been transferred from the slide to the die-change device, a replacement die held in readiness on the device is put in position on the slide.

According to the present invention an extrusion press has a die-slide for supporting an extrusion die or die-assembly which slide is movable transversely of the extrusion axis of the press, first hydraulic propulsion means for moving the slide between a first position in which a die or die-assembly supported by the slide is positioned with the axis of the die coincident with the extrusion axis of the press and a second position in which the axis of the die is not coincident with said extrusion axis, a die-charge mechanism arranged externally of the press and adjacent the second position of the die-slide, and further hydraulic propulsion means for displacing a die or die-assembly between the slide in the second position thereof and said die-change mechanism.

The arrangement of separate hydraulic propulsion means for the transfer of a die or die-assembly between die-slide and die-change device makes it possible to reduce the stroke and thereby also the lateral protrusion of the propulsion means for the die-slide, so that excessive protrusion of these means beyond the confines of the press is avoided.

The auxiliary propulsion means provided in accordance with the invention may consist of two separate units, one for moving a die or die-assembly from the slide into the die-change device, and the other for moving a die or die-assembly in the opposite direction. One or both of these units may be arranged on the die-slide.

According to a further feature of the invention, a die-change device may comprise a tracked carriage which is adapted to be displaced alongside the press and preferably parallel to the extrusion axis. The die-change device may accommodate two or more die-assemblies arranged on the carriage in axial alignment with each other, so that upon displacement of the carriage along its track, one or the other of two dies or die-assemblies on the carriage are moved into a position in which the die or die-assembly can be transferred between slide and carriage.

It is sometimes the practice to heat extrusion dies prior to their use in a press. In order to avoid heat losses from a pre-heated die, the die-change device according to the invention has preferably a heat-insulating casing in which part of the carriage enters so that a die or die-assembly on that carriage will retain its temperature during waiting times. The casing may be provided with heating means for making good any heat losses of the die or die-assembly in the casing.

An embodiment of the invention will now be described by way of example with reference to the accompanying drawings, in which.

Figure 1:
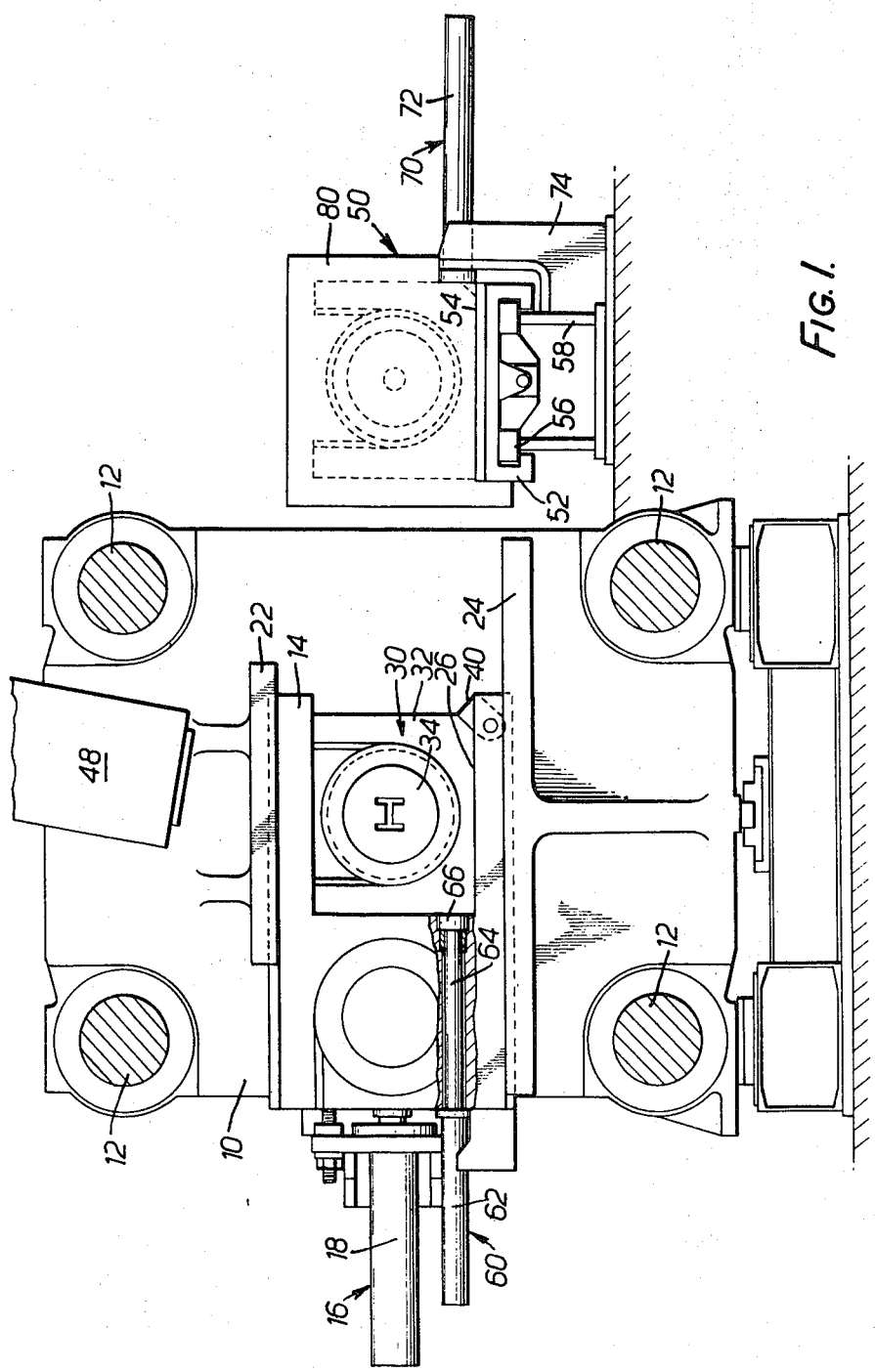
FIG. 1 is a section through a metal extrusion press according to the invention, together with its die-change device, the section being taken in the horizontal plane through the press axis.

In the drawings, only those parts of the press are shown which are necessary for the understanding of the invention, the other parts being of any suitable and well-known design.

The press shown is of the horizontal type and has a tunnelled platen 10 connected by four tension columns 12 to a main hydraulic cylinder, not illustrated. Arranged in front of the platen is a die-slide 14 which can be traversed across the extrusion axis X—X by means of a double-acting propulsion unit 16 arranged in the horizontal plane through the axis X—X. Propulsion unit 16 comprises a cylinder 18 projecting laterally from the die-slide, and a piston whose rod 20 is secured to the slide. Upper and lower guideways 22 and 24 respectively for the slide 14 are arranged on the platen 10. A die-aperture 26 of substantially rectangular shape is formed in slide 14, the aperture being open towards that side of the slide which is remote from the propulsion unit 16.

A die-assembly 30 is shown here as being inserted into the aperture 26, the assembly comprising a trough-shaped carrier member 32, a die proper 34, and two or more bolsters 36, 38. When a die 34 is to be exchanged, the entire assembly 30 is replaced and moved in and out of the die-slide 14 as a whole. A pivoted latch 40 is provided in the apertured part of the slide for holding a die-assembly 30 firmly in the aperture 26, the latch being swung aside when the die-assembly is to be moved in or out of its seat in the die-slide. Provided in the slide 14 is, further, a seat for an auxiliary tool 42 which, in the embodiment shown, consists of a closure plate, but may instead be a ring-shaped tool which permits ejection of unextrudable billet material from the press. Tool 42 is outside the extrusion axis X—X when the die-assembly 30 is in that axis.

An axially movable container 44 for billets is arranged in front of the die-assembly 30 so that billets can be extruded from that contained through the die 34, the extruded articles leaving the press through the tunnel 46 in the platen 10. The contacting surfaces of the platen and of the rear bolster 38 are formed with sharp edges where the passageway for the extruded articles intersects these surfaces, so that upon transverse movement of the die-slide 14 relative to the platen 10, those parts of extruded articles which are in the platen are severed from the extrusion remainder, including the billet-discard left in the die-assembly and the container 44. Alternatively, the billet remainder may be cut off by an overhead shear 48.

Arranged outside the press is a die-change device 50 for the purpose of receiving a die-assembly 30 after its use on the press and of replacing that assembly by another, 130. The die-change device is further adapted for the storage of die-assemblies during their waiting times.

The device 50 comprises essentially a carriage or trolley 52 having a flat platform 54 and being movable along a track 56 formed by rails on a base frame 58. The track runs parallel to the extrusion axis X—X and extends at both its ends beyond the space defined by the width of the die-slide 14. Movement of the carriage 52 along its track is effected by hydraulic propulsion means or a motor, not shown.

Auxiliary hydraulic units 60, 70 are provided separately from the die-propulsion unit 16 for the transfer of a die-assembly 30 from die-slide 14 to platform 54 and for the transfer of die-assembly 130 from the platform to the die-slide. Hydraulic unit 60 is built into the die-slide 14 and comprises a cylinder 62, a piston, not shown, and a piston rod 64 inserted into a bore in the slide and having a head 66 which can contact the carrier member 32 of die-assembly 30, as shown in both figures. The hydraulic unit 70 is arranged next to the die-change device and comprises a cylinder 72 which is attached by a bracket 74 to the base-frame 58.

The full stroke of the unit 16 displaces the die-slide 14 by a distance sufficient to move die-assembly 30 from a position in the extrusion axis X—X to one next to platform 54 of the carriage 52, but does not move the die-assembly on to that platform. The latter movement is effected by unit 60. Conversely, the die-assembly 130 is moved by the unit 70 from the platform 54 into the die-slide 14.

The platform 54 of the carriage 52 is adapted to accommodate at the same time two die-assemblies 30 and 130 placed on the platform in axial alignment with each other. Movement of the carriage 52 along its track 56 makes it possible for a used die-assembly 30 to be moved out of registry with the die-aperture 26 and a new die-assembly 130 to be moved subsequently into registry with that aperture.

It is sometimes the practice to heat the die or the die-assembly of a metal extrusion press in order to avoid the absorption of heat from the extruded metal by the die or die-assembly. In order to avoid heat losses from the die or die-assembly, there is arranged at one end of the track 56 a casing 80 into which the carriage 52, together with the die-assembly 130, can enter. The casing forms a heat-retaining chamber 82 for the die-assembly and may to this end have a heat-insulating lining, as well as heating elements 84, for making good any heat losses of the die or die-assembly in the casing 80. The heating elements may be in the form of gas burners or electric resistance or induction heaters. A door 86, which is normally closed, extends across the track 56, and a transparent panel 88 at one side of the casing makes it possible for a die-assembly in the casing to be observed from the outside. The heating chamber 82 may be equipped with means for measuring and controlling the temperature inside the chamber.

Means, not shown, are further provided for depositing a die-assembly 130 on to the platform 54 or for removing a die-assembly 30 from that platform. These means may consist of a hoist or other lifting tackle which can be displaceable parallel to the track 56.

In order to exchange the die-assembly 30 in the extrusion press for a die-assembly 130, for instance, if the die 34 in the assembly 30 has become worn, or if articles of a different cross-section are to be extruded, the die-slide 14 is first moved by its propulsion unit 16 to a position in which the die-assembly 30 is next to the platform 54. The die-assembly 30 is then ejected from its seat in the aperture 26 by the propulsion unit 60 built into the die-slide 14, after the latch 40 has been moved aside. The assembly 30 is now on the platform 54. The door 86 of the chamber 82 is opened and the carriage 52 moved along its track 56 into a position in which a die-assembly 130 which was in the heating chamber 82 is in registry with the aperture 26, while at the same time the assembly 30 is moved out of registry with that aperture. The die-assembly 130 is now pushed into that aperture by the propulsion means 70, and the die-slide 14 is thereupon returned by the propulsion means 16 into the position in which the die-assembly 130 is in the extrusion axis X—X and ready to assume operations.

While the die-assembly 130 is being transferred from the die-change device 50 into the press, or thereafter, the die-assembly 30 is removed from the platform 54 by the hoist or lifting tackle. The same or another hoist deposits another die-assembly on that part of the platform 54 which is in registry with the die-slide 14. The carriage 52 is then moved back to its starting position, so that the new die-assembly is in the heating chamber 82.

During extrusion operations, the container 44 is firmly urged towards the platen 10 by its axial propulsion means, not shown. Thus, a die-assembly seated in the aperture 26 and located in the extrusion axis X—X is firmly held in its position between that container and platen 10.

In order to cut off the billet remainder from the extruded article after each extrusion operation, the die-slide 14 is moved by the propulsion means 16, whereby the aforementioned cutting edges provided on the platen 10 and on the bolster 38 become operative. The same movement transfers an auxiliary tool 42 into alignment with the extrusion axis X—X.

All or some of the movements of the parts described in the foregoing may be automatically controlled, for instance, by electric limit switches. The carriage 52 or the door 86 may also be automatically blocked in response to the temperature in the heating chamber, so that a die-assembly in this chamber cannot be removed if its temperature is too low.

The invention is capable of various modifications. It is, for instance, possible to arrange both propulsion units 60 and 70 either on the die-slide 14 or outside the die-slide. The arrangement described here by way of example is, however, the preferred one. Similarly, the die-change device may be of a different design, and the die-assemblies, instead of being supported on a platform, may be suspended from an overhead structure.

Figure 2:
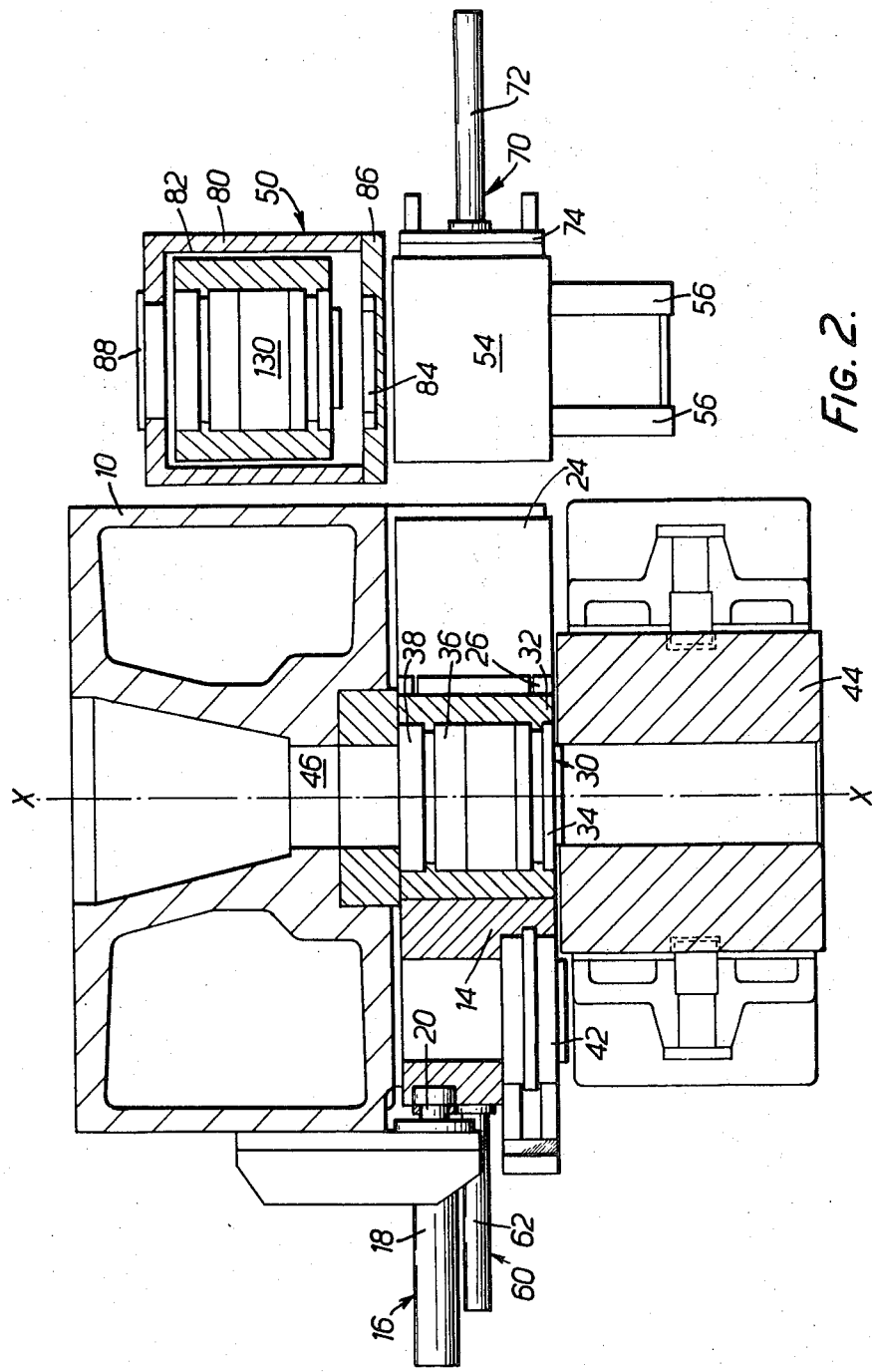
FIG. 2 is a vertical section taken along line II—II of FIG. 1.
Figure 3:
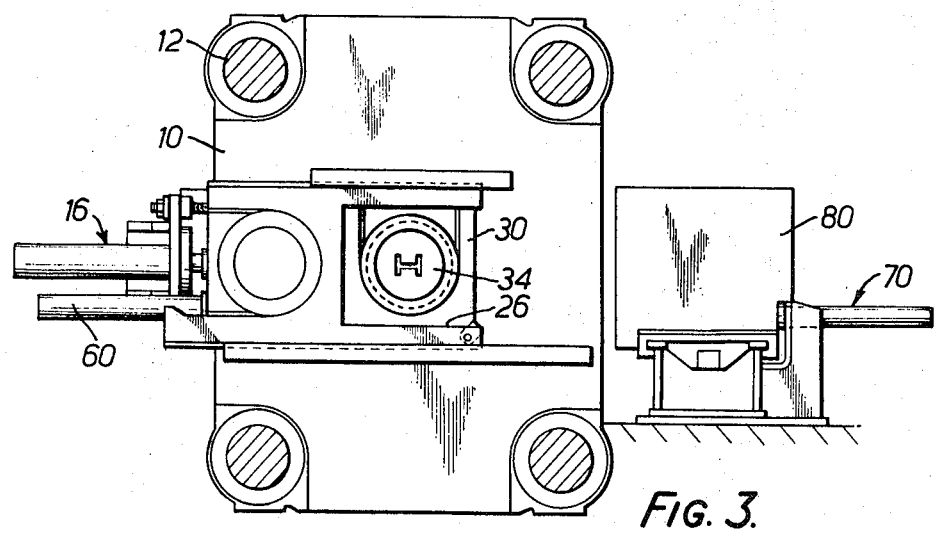
FIGS. 3 to 8 are views showing different stages during a die-exchange operation carried out on a press according to the invention.
Figure 4:
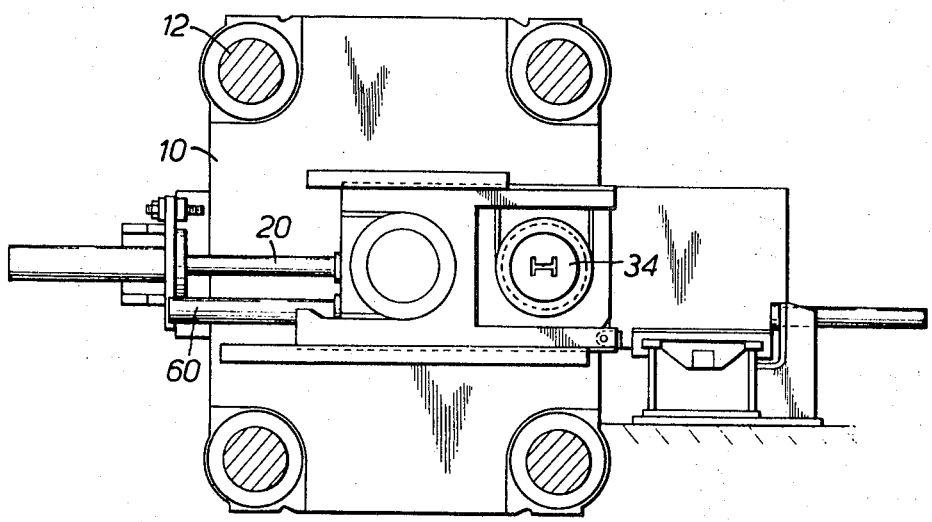
Figure 5:
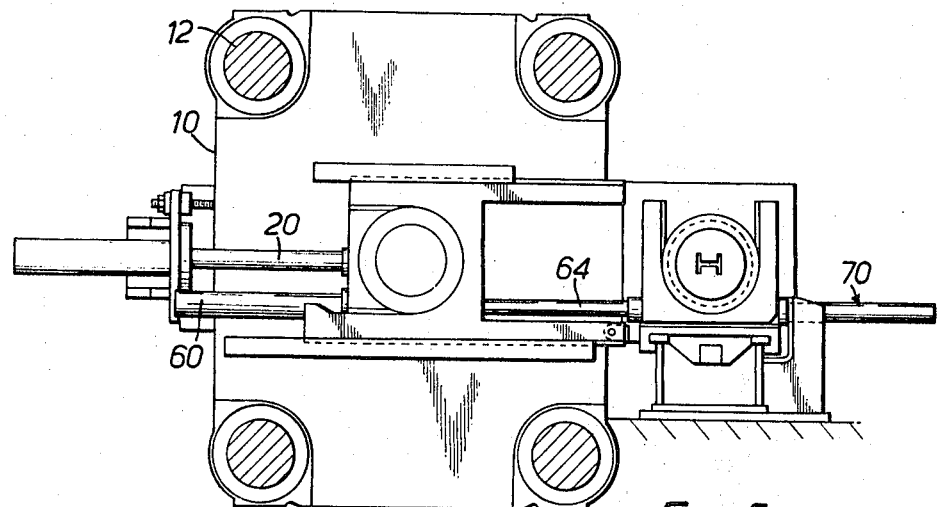
Figure 6:
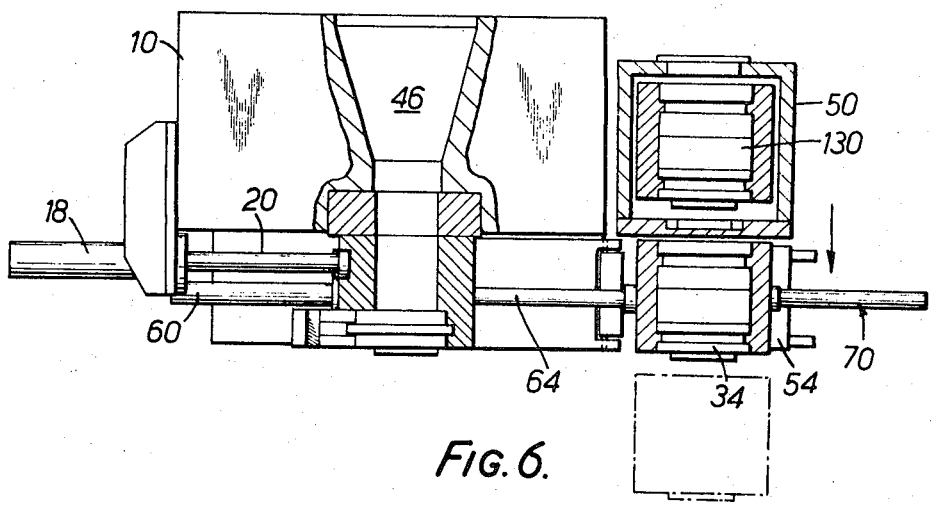
Figure 7:
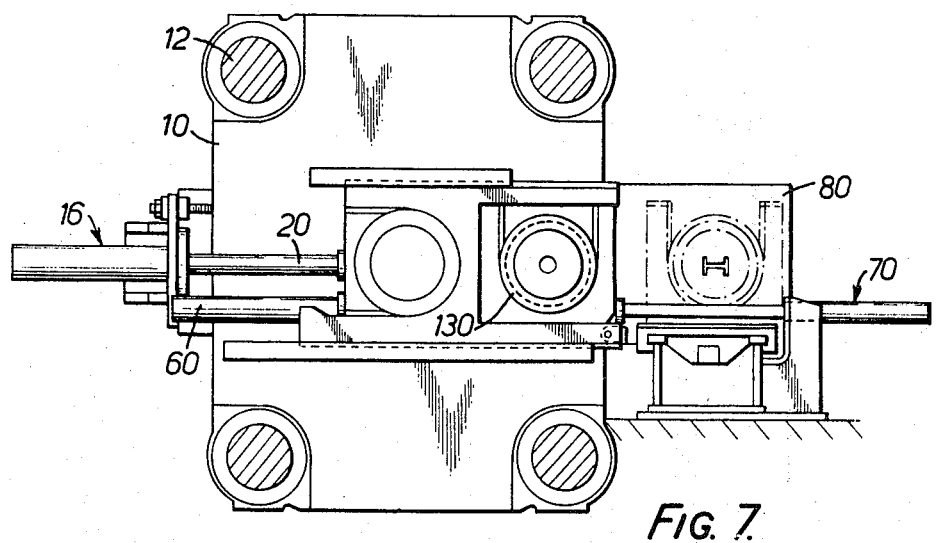
Figure 8:
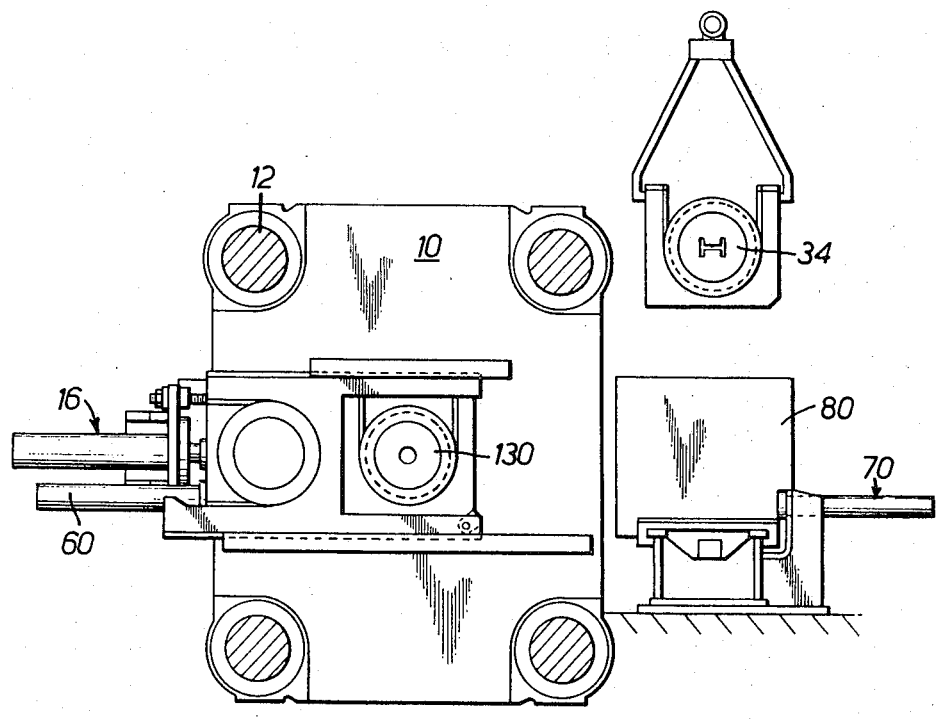

FIG. 3 shows the press illustrated in FIGS. 1 and 2 with the die-slide in the position in which the die-assembly 30 is in the extrusion axis X—X. In FIG. 4, the die-assembly is moved by the hydraulic propulsion unit 16 into the position in which the die-assembly 30 is next to the platform 54 of carriage 52. In FIG. 5, the die-assembly 30 is pushed by the unit 60 out of the aperture 26. FIG. 6 is a horizontal section of FIG. 5, showing the die-assembly 30 on the platform 54 and a new die-assembly 130 inside the heating chamber 82. In FIG. 7, the new die-assembly 130 is moved by the unit 70 from the platform 54 into the aperture of the die-slide 14. In FIG. 8, the die slide 14 is moved by the unit 60 into its starting position with the die-assembly in the extrusion axis X—X; the die-assembly 30 is lifted at the same time off the platform 54. In the example shown, the two die-assemblies 30 and 130 have dies with different apertures, the die 34 of die-assembly 30 having an aperture in the shape of an H, while the die 134 of die-assembly 130 has a circular aperture.

What I claim is:

1. An extrusion press having a die-slide for supporting an extrusion die which slide is movable transversely of the extrusion axis of the press, first hydraulic propulsion means for moving the slide between a first position in which a die supported by the slide is positioned with the axis of the die coincident with the extrusion axis of the press and a second position in which the axis of the die is not coincident with said extrusion axis, a die-change mechanism arranged externally of the press and adjacent the second position of the die-slide and further hydraulic propulsion means for displacing a die between the slide in the second position thereof and said die-change mechanism.

2. An extrusion press as claimed in claim 1 in which said slide has provision for supporting an assembly of which said die forms part and the further propulsion means serve to displace an assembly of which the die forms part between the slide and said die-change mechanism.

3. An extrusion press as claimed in claim 1 in which said further hydraulic propulsion means comprises two separate units, one for displacing a die from the slide to the die-change mechanism and one for displacing a die from the mechanism of the die-slide.

4. An extrusion press as claimed in claim 3 in which at least one of said units is carried by said die-slide.

5. An extrusion press as claimed in claim 2 in which said further hydraulic propulsion means comprises two separate units one for displacing a die-assembly from the slide to the die-change mechanism and one for displacing a die-assembly from the mechanism to the die-slide.

6. An extrusion press as claimed in claim 1 in which said die-change device includes a support which is displaceable alongside the press.

7. An extrusion press as claimed in claim 6 in which said support comprises a track extending alongside a press and a carriage displaceable along said track.

8. An extrusion press as claimed in claim 7 in which said track extends parallel to said extrusion axis.

9. An extrusion press as claimed in claim 7 in which said carriage has means for accommodating at least two dies arranged one behind the other in axial alignment with each other.

10. An extrusion press as claimed in claim 1 in which the die-change mechanism includes a thermally insulating casing which defines a chamber of sufficient size to receive at least one die.

11. An extrusion press as claimed in claim 7 in which the die-change mechanism includes a thermally insulating casing defining a chamber which encloses at least part of said track and of sufficient size to accommodate at least part of said carriage with at least one die supported thereon and closure means for closing said chamber with said part of the carriage and the die therein.

12. An extrusion press as claimed in claim 11 in which said chamber includes heating means to raise the temperature in the chamber to a value substantially the same as the temperature of a die entering the chamber whereby the temperature of the die is maintained substantially constant.

References Cited

UNITED STATES PATENTS

| | | | |
|---|---|---|---|
| 3,019,894 | 2/1962 | Delcroix | 72—263 |
| 2,880,867 | 4/1959 | Keck | 72—263 |
| 3,431,765 | 3/1969 | Lombard | 72—263 |

FOREIGN PATENTS

| | | |
|---|---|---|
| 897,040 | 5/1962 | Great Britian. |
| 1,178,307 | 5/1959 | France. |
| 1,101,565 | 10/1955 | France. |

CHARLES W. LANHAM, Primary Examiner

A. L. HAVIS, Assistant Examiner